United States Patent [19] [11] 3,939,332
Williams, Jr. et al. [45] Feb. 17, 1976

[54] ZERO INDICATOR FOR PLURAL SCALE SYSTEMS
[75] Inventors: Roger B. Williams, Jr., Sylvania, Ohio; Richard C. Loshbough, Temperance, Mich.
[73] Assignee: Reliance Electric Company, Pepper Pike, Ohio
[22] Filed: June 27, 1974
[21] Appl. No.: 483,646

[52] U.S. Cl. ....... 235/151.33; 177/165; 177/DIG. 3
[51] Int. Cl.² .................. G01G 9/413; G01G 13/14
[58] Field of Search ................ 235/151.33, 92 WT; 177/165, 199, 210, DIG. 3

[56] References Cited
UNITED STATES PATENTS
| | | | |
|---|---|---|---|
| 3,709,309 | 1/1973 | Williams et al. | 177/165 |
| 3,716,706 | 2/1973 | Gray | 235/151.33 |
| 3,770,069 | 11/1973 | Loshbough | 235/151.33 |
| 3,777,828 | 12/1973 | Dietemeyer | 177/165 |
| 3,789,202 | 1/1974 | Yamanaka | 235/151.33 |
| 3,797,595 | 3/1974 | Yin et al. | 177/DIG. 3 |

Primary Examiner—Malcolm A. Morrison
Assistant Examiner—Errol A. Krass

[57] ABSTRACT

In a plural scale system such as a parts counter having a minor scale for measuring the weight of a known number of sample parts and a major scale for measuring the weight of an unknown number of parts to be counted, apparatus for indicating when the scales are zeroed. Circuitry is provided for automatically correcting the weight outputs from each scale for a limited amount of zero errors. A digital display indicates the corrected weight on one of the scales. When the corrected weight on any of the other scales is on zero, an indicator light associated with such scale is illuminated.

11 Claims, 1 Drawing Figure

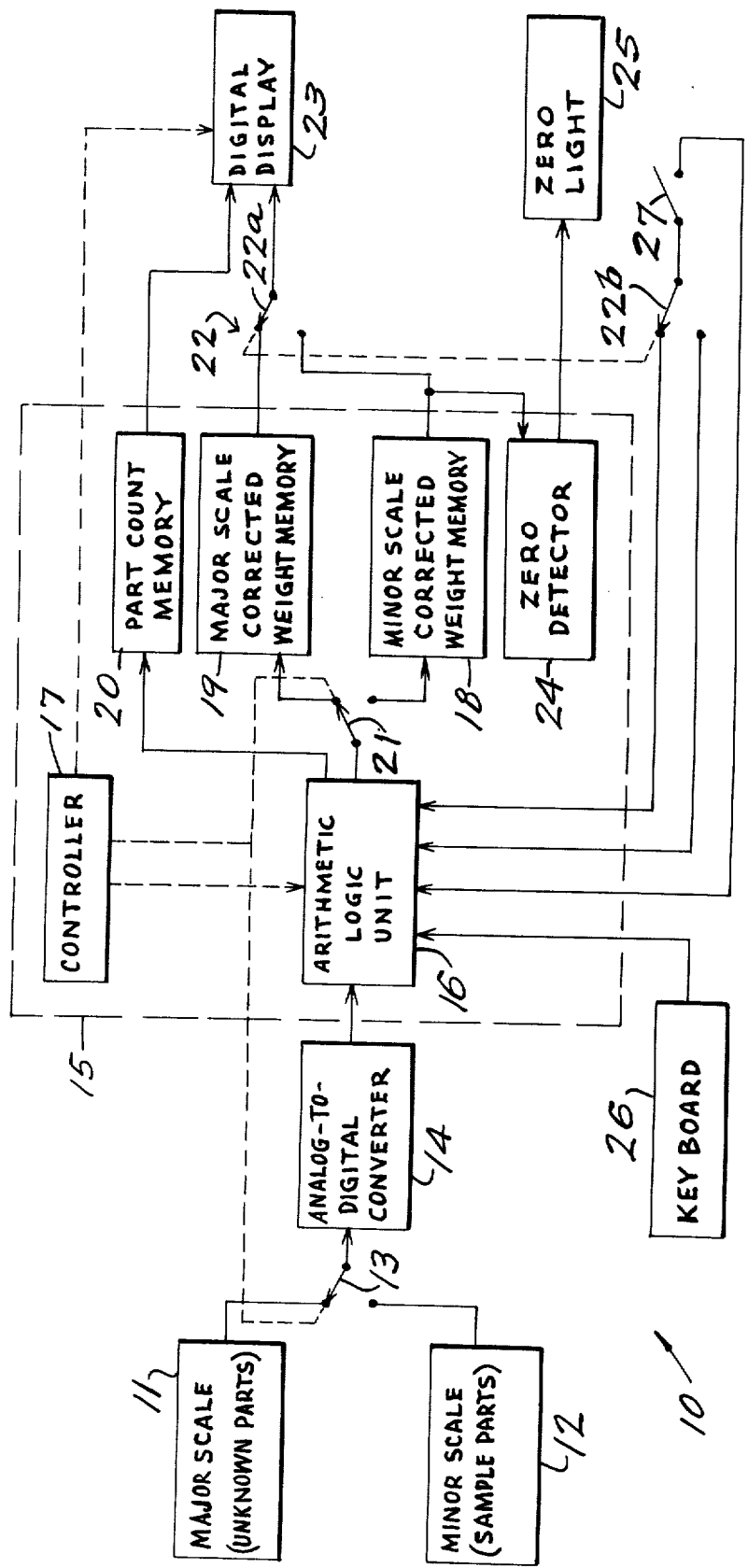

ZERO INDICATOR FOR PLURAL SCALE SYSTEMS

BACKGROUND OF THE INVENTION

This invention relates to weight measuring systems and more particularly to apparatus for indicating when each scale in a plural scale system such as a parts counter is zeroed.

Various types of systems involve the use of a plurality of scales for supplying weight data. One such system is a parts counter which determines a count of the number of parts in a container based upon the total net weight of the parts in the container and an average weight for such parts. A system of this type is typically provided with a minor or sample scale which measures the weight of a predetermined number of such parts and with a major scale which measures the weight of the parts to be counted. Computing apparatus then computes an average part weight from the total weight of the sample parts and the number of sample parts placed on the sample scale. Subsequently, the average part weight is divided into the net weight of the parts to be counted to obtain a count of the number of parts on the major scale. Parts counters of this type are generally provided with either a single display for selectively indicating the computed count, the weight of the parts to be counted and the weight of the sample parts, or the apparatus may be provided with individual displays for this data.

Other types of multiple scale systems also exist. A batch weighing system may, for example, include a plurality of weight measuring scales connected to a single batch process controller. The controller may include only a single indicator for displaying the weight on a selected one of the scales or a plurality of indicators for simultaneously indicating several weights.

One problem commonly encountered with plural scale systems is in correcting the weight output of each of the scales for zero error under a no load condition and in providing suitable means for indicating when one or more of the scales is not properly zeroed. There is in particular a problem in indicating the presence of zero error when a plurality of scales are selectively connected to only a single weight indicator. In systems of this type, an indication of whether or not a scale is properly zeroed has been provided only for the scale currently connected to the weight indicator. In many systems, such as in the piece counting system disclosed in U.S. Pat. No. 3,716,706 which issued on Feb. 13, 1973 to Alden J. Gray, two separate scales are selectively connected to a digital weight indicator on the piece counting apparatus. The individual scales are corrected for zero errors under a no load condition by means of a summing amplifier and a variable voltage source for each scale. Both the scale output and the variable voltage are connected to inputs to the summing amplifier. The scale is then connected through the summing amplifier to the digital display and the variable voltage source is adjusted until the display indicates zero for a no load condition. Each scale must be individually zeroed since only one scale is connected to the display at any given instant. While a scale is connected to the display, there is no indication whether or not a load is present on the other scale and, if a load is not present, whether or not the scale is zeroed. Even though a scale may have been zeroed at some time in the past, it does not necessarily remain zeroed due to changes in temperature, voltage fluctuations and changes in the operating parameters of various circuit components caused by, for example, component ageing. It is therefore desirable to have circuitry for automatically zeroing each of a plurality of scales and, at the same time, for indicating whether or not each scale is actually zeroed.

SUMMARY OF THE INVENTION

According to the present invention, improved apparatus is provided for use in a plural scale system, such as a parts counting system having a major scale for measuring the gross weight of a number of parts to be counted and a minor scale for measuring the weight of a predetermined number of sample parts, for automatically zeroing each of the scales and for indicating when such scales are zeroed. A digital computer causes the scales to be selectively connected to an analog-to-digital converter for generating digital weight signals. The computer also automatically corrects the digitized weight signals for weight errors caused by incorrect zero alignment of the scales. Weight errors are corrected by generating a correction factor which, when combined with the gross weight output from the scale, brings the scale output to zero when the scale is under a no load condition. The system includes a digital display which normally indicates the corrected weight on the major scale but may selectively indicate the corrected weight from either scale. The corrected weight of the minor scale, which is normally not connected to the digital display, is compared to zero by the computer. If such corrected weight is zero, an indicator light is illuminated to annunciate this fact. Thus, the display normally indicates whether or not the major scale is on zero, while the indicator light indicates whether the minor scale is on zero. When a corrected weight for any scale deviates from zero by less than a predetermined small amount, the computer generates a new correction factor for zeroing the weight from such scale and combines this factor with the output from such scale to produce a new corrected weight. A switch is provided for momentarily expanding the range of deviation for which a new correction factor is generated from the predetermined small amount for the scale connected to the digital display.

Accordingly, it is the preferred object of the invention to provide improved apparatus for indicating when each of a plurality of scales in a plural scale system is on zero.

Another object of the invention is to provide apparatus for indicating when the output of a gross weight scale and the output of a sample parts scale in a parts counter system having a single weight indicator are on zero.

Other objects and advantages of the invention will become apparent from the following detailed description, with reference being made to the accompanying drawing.

BRIEF DESCRIPTION OF THE DRAWING

The single FIGURE is a schematic block diagram of a parts counter incorporating the present invention.

DESCRIPTION OF THE PREFERRED EMBODIMENT

Turning now to the single FIGURE, a block diagram is shown of apparatus 10 for counting by weight the number of parts in a container which incorporates the present invention. The apparatus 10 includes a major scale 11 for measuring the weight of an unknown number of parts to be counted and a minor scale 12 for measuring the weight of a known number of sample parts. The scales 11 and 12 are preferably load cell scales which generate analog signals proportional to a weight placed on the load cell. Each of the scales 11 and 12 may, for example, be similar to the analog portion of the scale disclosed in U.S. Pat. No. 3,709,309 which issued on Jan. 9, 1973 to Roger B. Williams, Jr. et al. The analog portion of the scale disclosed in such Williams, Jr. et al. patent includes a load cell connected through amplifying and modifying circuitry which controls the span of the analog weight signal and compensates for thermal effects on the amplifying and modifying circuitry. The thermal effects are compensated for by periodically interrupting power to the load cell and generating an analog signal for bringing any unwanted D.C. output of the amplifier to zero. Gap filling circuitry maintains a constant weight output while power is interrupted to the load cell.

A switch 13 selectively connects the major scale 11 which measures the weight of the unknown parts to be counted and the minor scale 12 which measures the sample parts to an analog-to-digital converter 14. The analog-to-digital converter 14 may also be of a conventional design such as the converter portion of the circuitry disclosed in the Williams, Jr. et al. U.S. Pat. No. 3,709,309. The digitized weight output from the converter 14 is applied to a digital data processor 15 which corrects the digitized weight outputs from the scales 11 and 12 for zero errors, computes an average part weight from the output of the minor scale 12 and from such average part weight and the net weight of the parts to be counted computes a count of the number of parts on the major scale 11. Although the processor 15 may be in the form of a conventional general purpose digital computer, it is preferably a fixed program integrated circuit microprocessor, such as the MCS–4 microprocessor manufactured by Intel Corporation of Santa Clara, Calif. The MCS–4 microprocessor is capable of performing arithmetic functions such as addition, subtraction, multiplication and division, and of storing the results of such functions in internal integrated circuit memories. The MCS–4 microprocessor is provided with a fixed program which is readily developed by those skilled in the microcomputer programming art using conventional programming techniques. The program merely controls the sequence in which the input data is operated upon and the sequence in which data is outputed.

The data processor 15 includes an arithmetic logic unit 16 for performing the various arithmetic functions and digital memories. A portion of the digital memories forms a controller 17 which stores a fixed program for controlling the operating sequence of the data processor 15. The memories also include random access memories which are used during arithmetic operations by the arithmetic logic unit 16 and also for storing output data. The latter portion of the memory includes a register 18 for storing the corrected weight from the minor scale 12, a register 19 for storing the corrected weight measured by the major scale 11 and a parts count register 20 for storing the computed count of the number of parts on the major scale 11. The corrected weight output from the arithmetic logic unit 16 is selectively connected through a switch 21 to the registers 18 and 19. The controller 17 controls the switches 13 and 21 such that when the minor scale 11 is connected to the analog-to-digital converter 14, the corrected weight output from the arithmetic logic unit 16 is stored in the minor scale corrected weight register 18 and when the major scale 11 is connected to the analog-to-digital converter 14, the corrected weight output from the arithmetic logic unit 16 is stored in the major scale corrected weight register 19.

The weight outputs from the registers 18 and 19 are supplied from the data processor 15 through a switch 22 to a digital display 23. The switch 22 includes a pair of contacts 22a for selectively connecting the registers 18 and 19 to the digital display 23. Normally, the weight on the major scale 11 is displayed and, therefore, the switch 22 is set to connect the major scale corrected weight register 19 to the digital display 23. Through visual observation of the display 23, an operator can tell whether or not the major scale 11 is properly zeroed when weight is removed from the major scale 11. A zero detector 24 continuously compares the contents of the minor scale corrected weight register 18 with zero. Upon coincidence, the zero detector 24 causes a zero light 25 to become illuminated. If either the minor scale 12 is not properly zeroed or samples are present on the minor scale 12, the zero light 25 will be extinguished. In the event that an operator desires to know the weight of the samples on the minor scale 12 or to visually check on the degree of uncorrected zero error on the minor scale 12, the switch 22 is actuated to connect the minor scale corrected weight register 18 to the digital display 23. The parts count register 20 is also connected to the digital display 23. The digital display 23 may include a separate portion for displaying the parts count stored in the register 20 and the weight stored in the register 18 or 19 connected through the switch 22 to the display 23 or it may be designed to display only weight or a computed parts count at one time. In such case, the weight stored in the register connected through the switch 22 to the digital display is displayed until a parts count is computed and stored in the register 20. After a parts count is computed, the controller 17 may cause such count to appear on the display 23 in place of the weight in the register 19.

The apparatus 10 is also provided with a keyboard 26 for manually entering data into the data processor 15. The keyboard 26 may, for example, be used for entering a count of the known number of sample parts on the scale 12 or, when the sample scale 12 is not used, for entering an average weight for the parts on the major scale 11.

In operation, an unknown number of parts to be counted are placed upon the major scale 11 and a known number of sample parts are placed upon the minor scale 12. The controller 17 causes the switch 13 to first connect one of the scales 11 or 12 to the analog-to-digital converter 14 and then to connect the other scale to the converter 14. If the parts on the major scale 11 are in a container, a tare weight is entered into the processor 15 either automatically from the major scale 11 or through the keyboard 26. The controller 17 causes the arithmetic logic unit 16 to arithmetically combine a zero error correction factor and the tare weight with the digitized weight output of the major scale 11 to obtain a corrected net weight for the parts being counted and to store such corrected weight in the register 19. Similarly, the arithmetic logic unit 16 combines a zero weight error correction factor with the digitized output of the scale 12 to obtain a corrected sample part weight and stores the result in the register 18. Normally, the corrected net weight of the unknown number of parts on the major scale 11 stored in the register 19 is indicated on the digital display 23. However, the switch 22 may be set to display the corrected weight of the sample parts on the minor scale 12 stored in the register 18. The operator enters the known number of sample parts on the minor scale 12 through the keyboard 26 and hits a "count" switch which causes the arithmetic logic unit 16 to compute a count of the number of parts on the major scale 11 from the weights stored in the registers 18 and 19 and the entered sample part count. The computed part count is then stored in the register 20 and appears on the digital display 23.

After a part count cycle is completed, the parts are removed from the scales 11 and 12. The data processor 15 then goes through a cycle for assuring that the weights stored in the registers 18 and 19 are corrected for zero errors. The data processor 15 periodically goes through a weight correction cycle whenever the contents of the registers 18 or 19 are less than a predetermined minimum amount. Typically, the zero error correction factor may be recomputed for either scale 11 or 12 whenever the weight stored in the register 18 or 19 for such scale is less than one least significant weight digit for such scale. Thus, if the major scale 11 measures from 0.00 to 99.99 pounds in 0.01 pound increments, the zero weight correction factor for the major scale will be recomputed whenever the contents of the register 19 deviate from zero by less than ±0.01 pound. The zero weight error correction factor is computed by taking the difference between the digitized weight from each of the scales 11 and 12 and zero. Thus, when the correction factor for each scale is arithmetically combined with the digitized output of such scale, the weight output will be corrected for zero errors caused, for example, by changes in the voltage applied to the scale load cell or ageing effects of the load cell.

In some instances, errors will occur which are greater than the predetermined small error range for which the zero correction factor is updated. This may occur, for example, when the apparatus 10 is initially turned on and the registers 18 and 19 may be cleared. Therefore, a switch 27 is provided for momentarily expanding the capture range in which the zero error correction factor is updated. The switch 27 is connected through a second set of contacts 22b on the switch 22 to the arithmetic logic unit 16. The switch contacts 22b select the scale for which the zero error capture range is expanded from the predetermined small amount while the switch 27 is closed. Normally, it is desired to have the switch contacts 22b expand the zero error capture range for the scale connected to the digital display 23. This prevents the operator from accidentally expanding the capture range for the scale not connected to the display 23. Thus, if an operator observes that the scale connected to the display 23 is off, for example, by 1.45 pounds which is considerably larger than the normal predetermined small capture range of ±0.01 pound, he merely actuates the switch 27 to expand the capture range, causing the corrected weight for the connected scale to go to zero, as will be indicated on the display 23. Meanwhile, the zero detector 24 compares the corrected output of the other scale to zero and indicates on the light 25 whether or not such output is zero. If the zero light 25 is not on, it indicates either that there is an excessive zero error for the other scale or that parts are present on the other scale.

Although the zero indicator light 25 and the zero capture range expansion switch 27 perform different functions, it may, for simplicity, be desirable to combine these elements. A single push button illuminated indicator switch may be provided on or adjacent to the keyboard 26. When the button is momentarily pushed, the switch 27 is closed. The button also includes a legend "zero" which is illuminated by the zero detector 24, independently of actuation of the switch 27. Such a combination of functions in a single element reduces the complexity of the keyboard 26.

The apparatus 10 may be modified to indicate when the major scale 11 is on zero while the switch 22 is positioned to connect the minor scale corrected weight memory 18 to the digital display 23. The modification may consist of an additional set of contacts on the switch 22 which connects to the zero detector 24 the memory 18 or 19 which is not connected to the digital display. Or, a separate zero detector 24 and zero light 25 may be provided for indicating when each of the scales 11 and 12 is on zero.

Although the invention has been described specifically embodied in parts counting apparatus 10, it will be appreciated that the invention may be adapted to other plural scale systems in which a plurality of scales are selectively connected to a single weight display. Each of the scales may be connected to a separate zero detector and zero light for indicating when each scale is on zero. The weight display will also indicate whether or not a connected one of the scales is on zero and, when such scale is not on zero, the amount of deviation from zero. In the event that a scale does not go to zero when it is empty, the operator may selectively connect such scale to the weight display and cause its output to be zeroed by momentarily closing the capture range expand switch.

It will be appreciated that various other modifications and changes may be made in the above-described invention without departing from the spirit and the scope of the following claims.

What we claim is:

1. Weight measuring apparatus comprising, in combination, at least two scales, each of said scales generating a weight output signal, a digital display, switch means for causing said digital display to selectively indicate the weight output from one of said scales, and means for indicating when the weight output from the other of said scales is zero.

2. Weight measuring apparatus, as set forth in claim 1, and including means for correcting the weight output from each of said scales to compensate for any zero errors within a predetermined range, wherein said switch means for causing said digital display to selectively indicate the weight output from one of said scales causes said digital display to selectively indicate the corrected weight for such selected one scale, and wherein said zero indicating means indicates when the corrected weight output from the other os said scales is zero.

3. Weight measuring apparatus, as set forth in claim 2, and further including a manually actuated switch, and means responsive to actuation of said switch for expanding the predetermined range of zero errors for which the weight output from the scale connected to said digital display is corrected.

4. Weight measuring apparatus, as set forth in claim 2, wherein a zero indicating means is provided for each of said scales, each of said zero indicating means including means for detecting when the corrected weight output from a scale is zero, an indicator, and means responsive to said detecting means detecting a zero weight for illuminating said indicator.

5. In parts counting apparatus having a major scale for generating an output signal corresponding to the weight of a plurality of parts to be counted, a minor scale for generating an output signal corresponding to the weight of a predetermined number of such parts and means responsive to such weight output signals and to the predetermined number for determining a count of the number of parts on the major scale, apparatus for indicating when said major and minor scales are zeroed comprising, in combination, a digital display, switch means for causing said digital display to selectively indicate the weight output from one of said major and minor scales, and means for indicating when the weight output from said minor scale is zero, said digital display indicating when the weight output from said major scale is zero.

6. In parts counting apparatus, apparatus for indicating when major and minor scales are zeroed, as set forth in claim 5, wherein said indicating means includes means for detecting when the weight output from said minor scale is zero, an indicator, and means responsive to said detecting means detecting a zero weight for illuminating said indicator.

7. In parts counting apparatus, apparatus for indicating when major and minor scales are zeroed, as set forth in claim 5, and including means for correcting the weight output from said major scale to compensate for any zero errors within a predetermined range, means for correcting the weight output from said minor scale to compensate for any zero errors within a predetermined range, and wherein said digital display selectively indicates the corrected weight output from the selected one of said major and minor scales and said zero indicating means indicates when the corrected weight output from said minor scale is zero.

8. In parts counting apparatus, apparatus for indicating when major and minor scales are zeroed, as set forth in claim 7, and further including a manually actuated switch, and means responsive to actuation of said switch for expanding the predetermined range of zero errors for which the weight output from the scale connected to said digital display is corrected.

9. In parts counting apparatus, apparatus for indicating when major and minor scales are zeroed, as set forth in claim 8, wherein said switch has a push button and wherein said illuminated indicator forms the push button for said switch.

10. In parts counting apparatus, apparatus for indicating when major and minor scales are zeroed, as set forth in claim 7, and further including means for detecting when the corrected weight output from said major scale is zero, a second indicator, and means responsive to said major scale detecting means detecting a zero weight for illuminating said second indicator.

11. A weight measuring apparatus comprising, in combination, at least two scales, each of said scales being adapted to generate a weight output signal, a digital display, switching means for applying the weight output signal of one of said scales to said display when said switching means is in a first state and for applying the weight output signal from another one of said scales to said display when said switching means is in a second state, and means for visually indicating the existence of a zero weight condition in one of said scales when the weight output signal from another of said scales is being applied to said digital display.

* * * * *